(12) United States Patent
Toizumi

(10) Patent No.: US 11,922,312 B2
(45) Date of Patent: Mar. 5, 2024

(54) IMAGE CLASSIFICATION SYSTEM, IMAGE CLASSIFICATION METHOD, AND IMAGE CLASSIFICATION PROGRAM

(71) Applicant: NEC Corporation, Tokyo (JP)

(72) Inventor: Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 716 days.

(21) Appl. No.: 16/977,877

(22) PCT Filed: Mar. 5, 2018

(86) PCT No.: PCT/JP2018/008252
§ 371 (c)(1),
(2) Date: Sep. 3, 2020

(87) PCT Pub. No.: WO2019/171416
PCT Pub. Date: Sep. 12, 2019

(65) Prior Publication Data
US 2021/0056364 A1 Feb. 25, 2021

(51) Int. Cl.
*G06N 3/082* (2023.01)
*G06F 18/214* (2023.01)
(Continued)

(52) U.S. Cl.
CPC ......... *G06N 3/082* (2013.01); *G06F 18/2155* (2023.01); *G06F 18/2411* (2023.01);
(Continued)

(58) Field of Classification Search
CPC .......... G06N 3/082; G06N 3/08; G06N 3/045; G06N 3/047; G06N 20/10; G06F 18/2155;
(Continued)

(56) References Cited

U.S. PATENT DOCUMENTS

2016/0078284 A1\* 3/2016 Sato ................. G06F 18/24133
382/118
2017/0330059 A1\* 11/2017 Novotny ............ G06V 10/7515

FOREIGN PATENT DOCUMENTS

| JP | 2002-544629 A | 12/2002 |
| JP | 2003-150960 A | 5/2003 |
| JP | 2017-151679 A | 8/2017 |

OTHER PUBLICATIONS

Frome et al., "DeViSE: A Deep Visual-Semantic Embedding Model," Advances in Neural Information Processing Systems, Sep. 26, 2013, pp. 1-11 (Year: 2013).\*

(Continued)

*Primary Examiner* — John W Lee

(57) ABSTRACT

An image classification system 10 includes: a probability computation means 11 which computes a known-image probability, which is the probability that an input image corresponds to a known image associated with a seen label that indicates the class into which content indicated by the known image is classified; a likelihood computation means 12 which computes both the likelihood that content indicated by the input image is classified into the same class as content indicated by an unseen image associated with an unseen label, and the likelihood that the content indicated by the input image is classified into the same class as the content indicated by the known image; and a correction means 13 which corrects each computed likelihood using the computed known-image probability.

12 Claims, 7 Drawing Sheets

(51) Int. Cl.
*G06F 18/2411* (2023.01)
*G06F 18/2415* (2023.01)
*G06F 18/2433* (2023.01)
*G06F 18/25* (2023.01)
*G06N 3/045* (2023.01)
*G06N 3/047* (2023.01)
*G06N 3/08* (2023.01)
*G06N 20/10* (2019.01)
*G06T 7/00* (2017.01)
*G06V 10/764* (2022.01)
*G06V 10/82* (2022.01)

(52) U.S. Cl.
CPC ........... *G06F 18/2415* (2023.01); *G06N 3/08* (2013.01); *G06V 10/764* (2022.01); *G06V 10/82* (2022.01)

(58) Field of Classification Search
CPC ............. G06F 18/2411; G06F 18/2415; G06F 18/254; G06F 18/2433; G06V 10/764; G06V 10/82; G06T 7/00
See application file for complete search history.

(56) References Cited

OTHER PUBLICATIONS

Japanese Office Action for JP Application No. 2020-504481 dated Jul. 6, 2021 with English Translation.
Hugo Larochelle, et al., "Zero-data Learning of New Tasks", Proceedings of the Twenty-Third AAAI Conference on Artificial Intelligence, 2008, vol. 2, pp. 646-651.
Andrea Frome, et al., "DeViSE: A Deep Visual-Semantic Embedding Model", Advances in Neural Information Processing Systems, Sep. 26, 2013, pp. 1-11.
International Search Report for PCT/JP2018/008252 dated May 22, 2018 (PCT/ISA/210).

\* cited by examiner

IMAGE CLASSIFICATION SYSTEM, IMAGE CLASSIFICATION METHOD, AND IMAGE CLASSIFICATION PROGRAM

CROSS REFERENCE TO RELATED APPLICATIONS

This application is a National Stage of International Application No. PCT/JP2018/008252 filed Mar. 5, 2018.

TECHNICAL FIELD

The present invention relates to an image classification system, an image classification method, and an image classification program, and particularly to an image classification system, an image classification method, and an image classification program for learning parameters used in generalized zero-shot recognition to identify unseen images.

BACKGROUND ART

One of the problems set in the field of image recognition is the problem of recognizing unseen images, which is called zero-shot recognition. Zero-shot recognition is described, for example, in Non Patent Literature (NPL) 1.

In zero-shot recognition, labels of training data and test data are prepared separately. A recognizer that has learned using only training data estimates an unseen label indicative of the content of the image included in the test data.

Further, in zero-shot recognition, in addition to features of images (hereinafter, called image features), features of labels (hereinafter, called label features) are used as auxiliary information. In the learning phase, a linear mapping of image features indicated by the image that known training data has and label features indicated by the label that the training data has is learned.

In the test phase, the recognizer uses the learned linear mapping to transform the image features indicated by the test data into label features. The recognizer then recognizes the label that the test data has, in the space of the transformed label features.

Further, in the field of image recognition, the problem called generalized zero-shot recognition has also been set, in which the targets of recognition in the test phase include seen labels that the training data have. Generalized zero-shot recognition is described, for example, in NPL 2.

CITATION LIST

Non Patent Literature

NPL 1: H. Larochelle, D. Erhan, and Y. Bengio, "Zero-Data Learning of New Tasks," Proceedings of the Twenty-Third AAAI Conference on Artificial Intelligence, 2008.

NPL 2: A. Frome, G. S. Corrado, J. Shlens, S. Bengio, J. Dean, M. A. Ranzato, and T. Mikolov, "DeViSE: A Deep Visual-Semantic Embedding Model," In NIPS, 2013.

SUMMARY OF INVENTION

Technical Problem

In generalized zero-shot recognition, there is a problem that the model overfits to the seen labels used as training data, resulting in less accurate recognition of unseen labels that the test data have.

The reason is that, since labels of unseen images included in the test data are not used for learning, the model overfits to the labels of the known images used as the training data. There is a need for a technique, for solving the above-described problems, that can accurately estimate the label of the image included in the test data.

OBJECT OF INVENTION

Accordingly, it is an object of the present invention, for solving the above-described problems, to provide an image classification system, an image classification method, and an image classification program capable of accurately estimating the label of the image included in test data.

Solution to Problem

An image classification system according to the present invention includes: a probability computation means which computes a known-image probability, which is the probability that an input image corresponds to a known image associated with a seen label that indicates the class into which content indicated by the known image is classified; a likelihood computation means which computes both the likelihood that content indicated by the input image is classified into the same class as content indicated by an unseen image associated with an unseen label, and the likelihood that the content indicated by the input image is classified into the same class as the content indicated by the known image; and a correction means which corrects each computed likelihood using the computed known-image probability.

An image classification method according to the present invention includes: computing a known-image probability, which is the probability that an input image corresponds to a known image associated with a seen label that indicates the class into which content indicated by the known image is classified; computing both the likelihood that content indicated by the input image is classified into the same class as content indicated by an unseen image associated with an unseen label, and the likelihood that the content indicated by the input image is classified into the same class as the content indicated by the known image; and correcting each computed likelihood using the computed known-image probability.

An image classification program according to the present invention causes a computer to perform: probability computation processing of computing a known-image probability, which is the probability that an input image corresponds to a known image associated with a seen label that indicates the class into which content indicated by the known image is classified; likelihood computation processing of computing both the likelihood that content indicated by the input image is classified into the same class as content indicated by an unseen image associated with an unseen label, and the likelihood that the content indicated by the input image is classified into the same class as the content indicated by the known image; and correction processing of correcting each computed likelihood using the computed known-image probability.

Advantageous Effects of Invention

The present invention enables accurate estimation of the label of the image included in the test data.

DESCRIPTION OF EMBODIMENT

First Exemplary Embodiment

[Description of Configuration]

Figure 1:
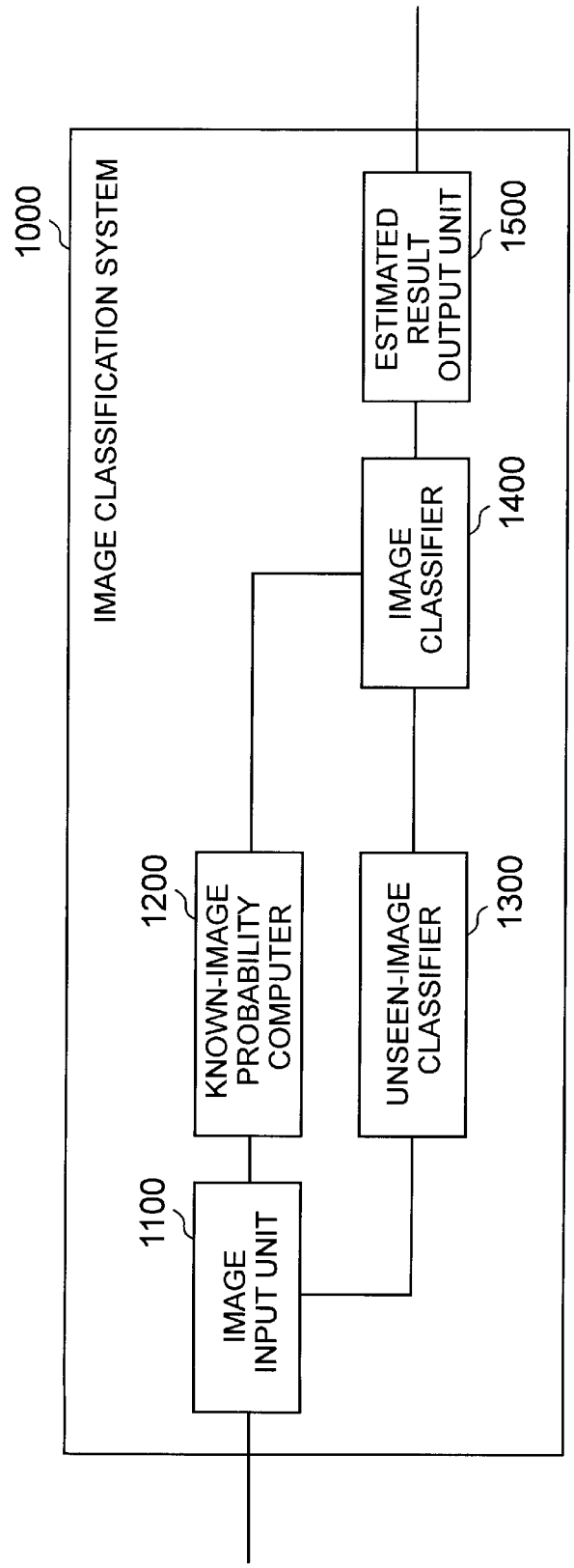
FIG. 1 is a block diagram showing an example of a structure of a first exemplary embodiment of an image classification system according to the present invention.

Exemplary embodiment of the present invention will be described below with reference to the drawings. FIG. 1 is a block diagram showing an example of a structure of a first exemplary embodiment of the image classification system according to the present invention.

The image classification system 1000 shown in FIG. 1 is a system for recognizing an image with its label unseen (hereinafter, called unseen image). The image classification system 1000 is also a system that learns parameters of components used for recognition.

The image classification system 1000 of the present exemplary embodiment shown in FIG. 1 includes an image input unit 1100, a known-image probability computer 1200, an unseen-image classifier 1300, an image classifier 1400, and an estimated result output unit 1500.

In the image input unit 1100, information indicating images is input. In the image input unit 1100 of the present exemplary embodiment, information indicating images as a mixture of unseen images and images with seen labels (hereinafter, called known images) is input.

In the image input unit 1100, for example, information indicating an image is input from a file, a database, a communicator, or a sensor. The input information indicating the image is, for example, information represented in three dimensions having the number of vertical pixels, the number of horizontal pixels, and color information such as the number of bits.

Alternatively, in the image input unit 1100, information indicating a plurality of sheets of images may be input. The information indicating the plurality of sheets of images is, for example, information represented in four dimensions having the number of sheets, the number of vertical pixels, the number of horizontal pixels, and color information such as the number of bits.

Still alternatively, information indicating a grayscale image may be input into the image input unit 1100. The information indicating the grayscale image is, for example, information represented in two dimensions having the number of vertical pixels and the number of horizontal pixels. The image input unit 1100 inputs the input information indicating the image into both the known-image probability computer 1200 and the unseen-image classifier 1300.

The known-image probability computer 1200 has a function of computing a probability that the image indicated by the information input from the image input unit 1100 corresponds to a known image. The known-image probability computer 1200 inputs the computed probability as a known-image probability into the image classifier 1400.

The known-image probability computer 1200 computes the known-image probability, which is the probability that the image indicated by the input information corresponds to a known image. The known-image probability computer 1200 can also learn a function used for computing the known-image probability.

Figure 2:
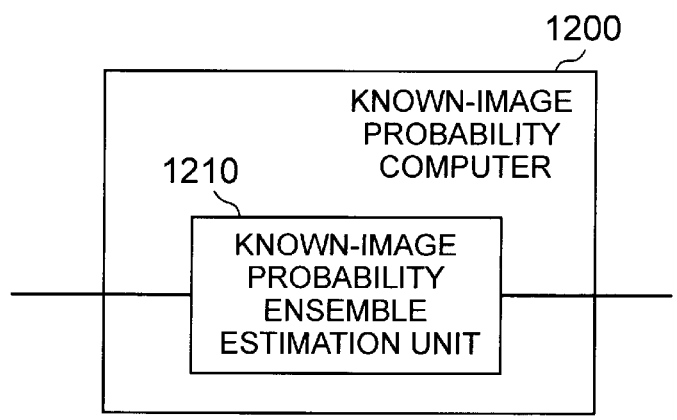
FIG. 2 is a block diagram showing an example of a structure of a known-image probability computer 1200.

FIG. 2 is a block diagram showing an example of a structure of the known-image probability computer 1200. As shown in FIG. 2, the known-image probability computer 1200 includes a known-image probability ensemble estimation unit 1210.

Figure 3:
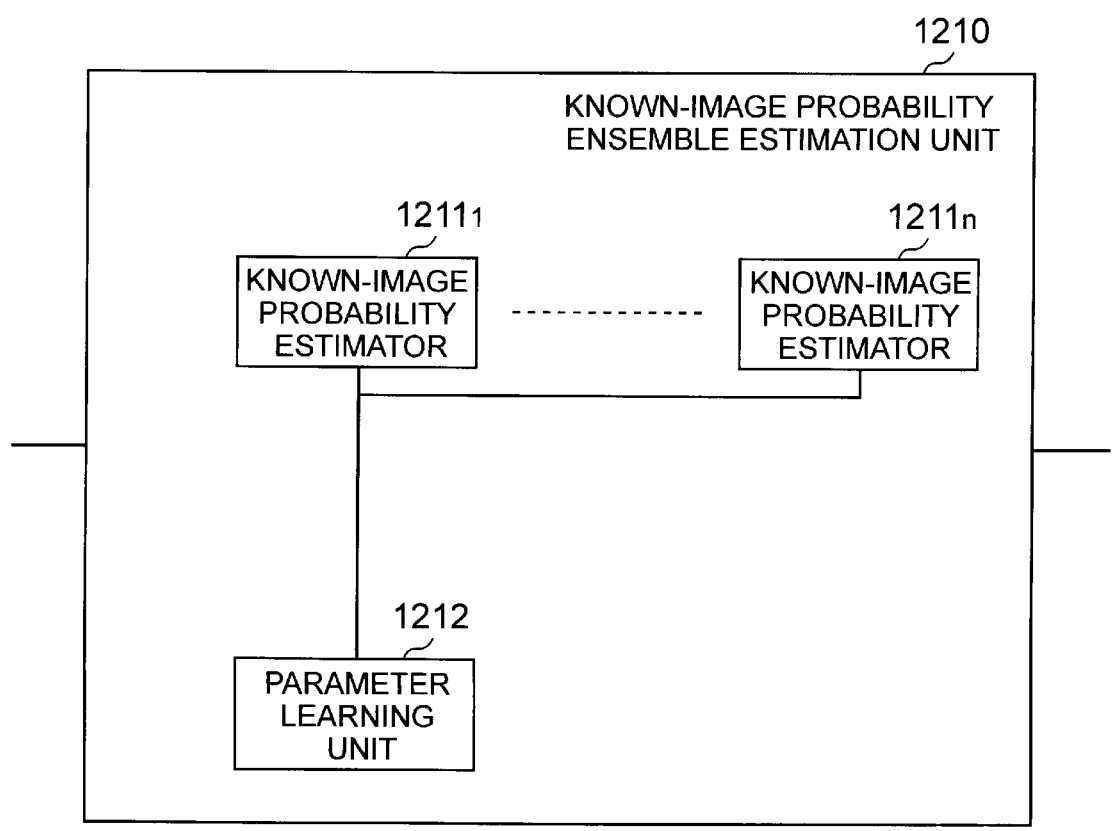
FIG. 3 is a block diagram showing an example of a structure of a known-image probability ensemble estimation unit 1210.

FIG. 3 is a block diagram showing an example of a structure of the known-image probability ensemble estimation unit 1210. As shown in FIG. 3, the known-image probability ensemble estimation unit 1210 includes a known-image probability estimator $1211_1$ to a known-image probability estimator $1211_n$, and a parameter learning unit 1212 (where n is a natural number of 1 or greater).

The known-image probability estimator $1211_1$ in the known-image probability ensemble estimation unit 1210 has a function of estimating a known-image probability for the image indicated by the input information. It should be noted that the known-image probability estimator $1211_2$ to the known-image probability estimator $1211_n$ each have the function similar to that of the known-image probability estimator $1211_1$. The known-image probability estimators $1211_1$ to $1211_n$ are components used when estimating the known-image probability.

The parameter learning unit 1212 has a function of learning each parameter of the known-image probability estimators $1211_1$ to $1211_n$. The parameter learning unit 1212 is a component used when learning the parameters.

The known-image probability estimators $1211_1$ to $1211_n$ of the present exemplary embodiment are each configured with a neural network that has known images as an input and a vector having the dimensions of the number of classes corresponding to a plurality of known images as an output.

The parameter learning unit 1212 learns each parameter of the known-image probability estimators $1211_1$ to $1211_n$ so as to minimize the value of the expression (1) below. The parameter learning unit 1212 learns each parameter of the known-image probability estimators $1211_1$ to $1211_n$ by using, for example, the following error function.

[Math. 1]

$$E(y, y_{pred}) = y \log y_{pred} + \beta(1-y)\log(1-y_{pred}) \quad (1)$$

In the expression (1), y is a correct value of the known-image probability, represented by a one-hot vector, for example, and $y_{pred}$ is an estimated value of the known-image probability. It should be noted that the one-hot vector is a vector in which only one element is High (1) and the other elements are Low (0). In the expression (1), β is a hyper parameter, which takes a value of 0 or greater. Adjusting the value of β enables maintaining the balance between the estimated result of the label of the known image and the estimated result of the label of the unseen image.

Further, the error function used by the parameter learning unit 1212 is not limited to the expression (1). For example, in the case where continuous values not represented by a one-hot vector are assumed as an output, the parameter learning unit 1212 uses an error function such as a mean squared error (MSE) or a mean absolute error (MAE).

Further, a sigmoidal function or a softmax function, for example, is used as an activation function for the output layer of a neural network. It should be noted that a function other than the sigmoidal function or the softmax function may be used as the activation function.

The neural network constituting the known-image probability estimator may have any configuration. For example, VGG or ResNet (Residual Network) may be used as the neural network.

Alternatively, a neural network with a configuration in which the first half of a general network is used without modification and the second half of the network, for use in classification, is substituted may be used. Still alternatively, a neural network may be newly constructed after image features etc. are extracted using a general convolutional network.

The parameter learning unit 1212 of the present exemplary embodiment uses the error function of the expression (1) to learn each parameter of the plurality of known-image probability estimators $1211_1$ to $1211_n$.

At the time of learning, the parameter learning unit 1212 uses, for example, different random seed values for each of the known-image probability estimators as initial parameters for learning. That is, the parameter learning unit 1212 sets different random seed values for each of the known-image probability estimators, as the initial parameters of the respective neural networks constituting the known-image probability estimators.

After the learning, the parameter learning unit 1212 outputs the plurality of learned parameters. The learned parameters being output also include, for example, a parameter used for updating the gradient of the neural network. The learning by the parameter learning unit 1212 may possibly be repeated a plurality of number of times.

The plurality of known-image probability estimators $1211_1$ to $1211_n$ respectively use the learned parameters obtained by the parameter learning unit 1212 to respectively estimate the known-image probabilities. The known-image probability ensemble estimation unit 1210 outputs, for example, an average value of the estimated known-image probabilities.

When an average value of a plurality of known-image probabilities is used for label estimation, the possibility that an unseen image existent in common, similar portions between known images is estimated as a known image is reduced. That is, the use of an average value of a plurality of known-image probabilities enables accurate separation between unseen and known images that were separated ambiguously when only a known-image probability output from a single known-image probability estimator was used.

It should be noted that as another example of ensemble learning, a network using Dropout may be used. For example, in one network learning, the known-image probability estimators $1211_1$ to $1211_n$ may each be configured with a network having one or more Dropout layers inserted between middle layers. Further, in the learning using the Dropout as well, a single network may be used, or a plurality of networks having different random seed values as the initial parameters may be used.

Besides the learning methods described above, the known-image probability computer 1200 may use learning methods used for anomaly detection, such as an auto encoder or a one-class support vector machine (SVM).

Further, in the case where a target of identification is a moving image, made up of a plurality of time frames, or a plurality of similar images, the known-image probability computer 1200 may set a common value in a plurality of estimation processes as a known-image probability. Alternatively, the known-image probability computer 1200 may set, for example, an average value of known-image probabilities computed in a plurality of estimation processes as a known-image probability.

For example, for each image in successive time frames, the known-image probability computer 1200 stores, in a memory, a known-image probability that is estimated from an image in the immediately preceding time frame. Then, the known-image probability computer 1200 may output a probability obtained by multiplying a known-image probability that is estimated only from an image in the next time frame by the known-image probability stored in the memory.

The unseen-image classifier 1300 has a function of classifying the content indicated by the image indicated by the information input from the image input unit 1100, into each class. In the classes for classification, classes having contents shown by unseen images classified therein (hereinafter, called classes of unseen images) are included as well.

Specifically, for each of the classes as a mixture of classes having contents shown by known images classified therein (hereinafter, called classes of known images) and the classes of unseen images, the unseen-image classifier 1300 computes a likelihood that the content indicated by the image indicated by the input information is classified into that class. The computed likelihoods are represented by a vector having the dimensions corresponding to the total number of classes. Each component of the vector is represented by a likelihood value that takes a value between 0 and 1.

The likelihood value of each component represents a likelihood to fall into a respective class. That is, when the likelihood value is 0, the content indicated by the image is least likely to fall into the class corresponding to the likelihood value. When the likelihood value is 1, the content indicated by the image is most likely to fall into the class corresponding to the likelihood value.

Alternatively, for the classes as a mixture of the classes of known images and the classes of unseen images, the unseen-image classifier 1300 may compute a cosine similarity vector made up of cosine similarities between the content indicated by the image indicated by the input information and the respective classes. The cosign similarity vector is represented by a vector having the dimensions of the total number of classes. Each component of the cosine similarity vector is represented by a cosine similarity that takes a value between −1 and 1.

The cosine similarity of each component represents a similarity to a respective class. That is, when the cosine similarity is −1, the content indicated by the image is least similar to the class corresponding to the cosine similarity. When the cosine similarity is 1, the content indicated by the image is most similar to the class corresponding to the cosine similarity.

The unseen-image classifier 1300 is made up of a generalized zero-shot recognizer, for example. The generalized zero-shot recognizer specifically estimates a label corresponding to the image indicated by the input information, using a transformation method between image features and label features learned using sets of known images and labels.

As the generalized zero-shot recognizer used in the present exemplary embodiment, the recognizer described in NPL 2, for example, may be used. Alternatively, a recognizer other than the one described in NPL 2 may be used as the generalized zero-shot recognizer.

As described above, in the image input unit 1100, information indicating images as a mixture of unseen and known images is input. Thus, the unseen-image classifier 1300 outputs the likelihoods for classes assumed to be indicated by labels corresponding respectively to the unseen and known images. The unseen-image classifier 1300 inputs the likelihoods for the respective classes into the image classifier 1400.

The image classifier 1400 has a function of correcting a likelihood by multiplying the likelihood input from the unseen-image classifier 1300 by the known-image probability input from the known-image probability computer 1200. The image classifier 1400 inputs the corrected likelihoods into the estimated result output unit 1500.

The image classifier 1400 uses the known-image probability input from the known-image probability computer 1200 to correct the likelihoods input from the unseen-image classifier 1300. Specifically, the image classifier 1400 multiplies the likelihood for any class assumed to be indicated by the label corresponding to the known image input from the unseen-image classifier 1300, by the known-image probability.

Further, the image classifier 1400 multiplies the likelihood for any class assumed to be indicated by the label corresponding to the unseen image input from the unseen-image classifier 1300, by (1—known-image probability). The image classifier 1400 inputs the likelihoods corrected as described above, into the estimated result output unit 1500.

It should be noted that the image classifier 1400 may multiply the likelihood by a value other than the known-image probability. For example, the image classifier 1400 may multiply the likelihood by a value obtained by performing an operation on the known-image probability using a given function, such as a square value of the known-image probability.

The estimated result output unit 1500 has a function of outputting, as an estimated result, the label for the image indicated by the input information, on the basis of the corrected likelihoods input from the image classifier 1400.

For example, the estimated result output unit 1500 estimates the class corresponding to the greatest likelihood among all the likelihoods multiplied by the known-image probability or (1—known-image probability), to be the class indicated by the label of the image indicated by the input information. The estimated result output unit 1500 inputs the estimated result into, for example, an external device.

[Description of Operation]

Figure 4:
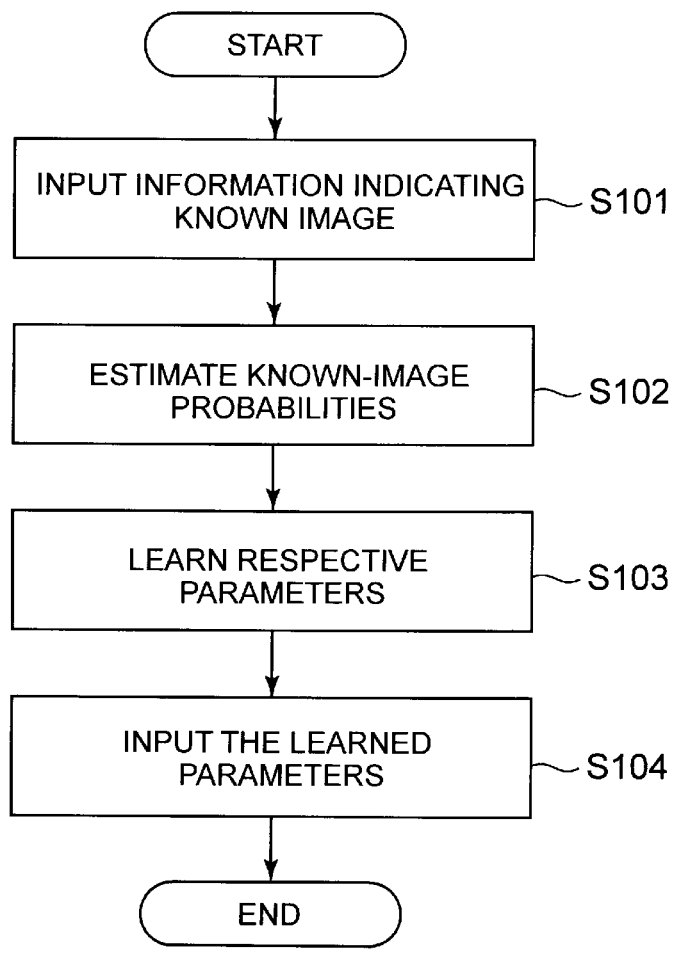
FIG. 4 is a flowchart showing an operation of estimator parameter learning processing by the image classification system 1000 of the first exemplary embodiment.

An operation of learning parameters of the estimators by the image classification system 1000 of the present exemplary embodiment will now be described with reference to FIG. 4. FIG. 4 is a flowchart showing an operation of estimator parameter learning processing by the image classification system 1000 of the first exemplary embodiment.

Firstly, in the image input unit 1100, information indicating a known image is input (step S101). The image input unit 1100 inputs the input information indicating the known image into the known-image probability computer 1200.

Next, the known-image probability estimators $1211_1$ to $1211_n$ of the known-image probability computer 1200 respectively estimate known-image probabilities for the known image indicated by the information input from the image input unit 1100 (step S102). The known-image probability estimators $1211_1$ to $1211_n$ respectively input the estimated known-image probabilities into the parameter learning unit 1212.

Next, the parameter learning unit 1212 assigns each of the input known-image probabilities to the expression (1), and learns each parameter of the known-image probability estimators $1211_1$ to $1211_n$ so as to minimize the value of the expression (1) (step S103).

Next, the parameter learning unit 1212 inputs the learned parameters into the known-image probability estimators $1211_1$ to $1211_n$, respectively (step S104). After the inputting, the image classification system 1000 terminates the estimator parameter learning processing. It should be noted that the processing in steps S103 to S104 may be repeated a plurality of number of times.

Figure 5:
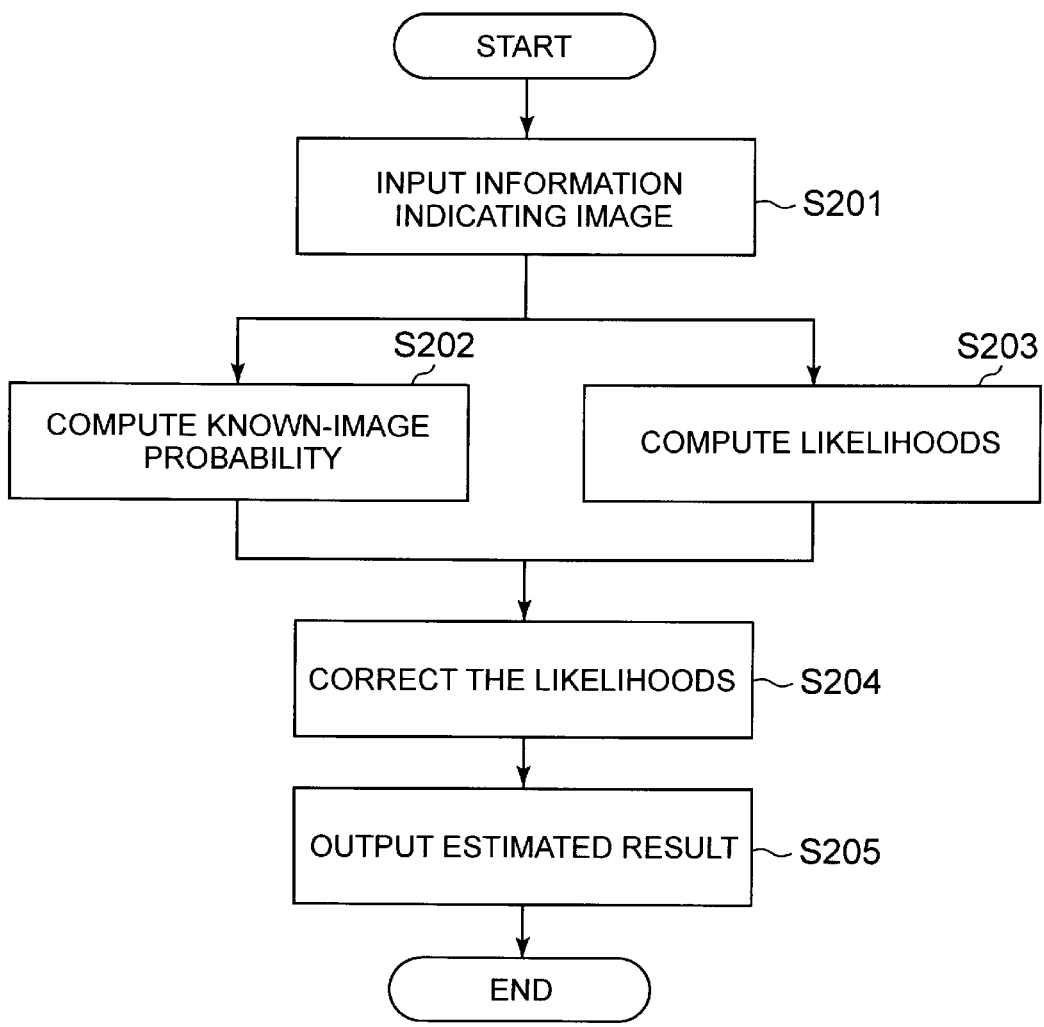
FIG. 5 is a flowchart showing an operation of image classification processing by the image classification system 1000 of the first exemplary embodiment.

An operation of classifying images by the image classification system 1000 of the present exemplary embodiment will now be described with reference to FIG. 5. FIG. 5 is a flowchart showing an operation of image classification processing by the image classification system 1000 of the first exemplary embodiment.

Firstly, information indicating an image is input into the image input unit 1100 (step S201). The image input unit 1100 inputs the input information indicating the image into both the known-image probability computer 1200 and the unseen-image classifier 1300.

Next, the known-image probability ensemble estimation unit 1210 of the known-image probability computer 1200 uses the known-image probability estimators $1211_1$ to $1211_n$ to compute a known-image probability of the image indicated by the information input from the image input unit 1100 (step S202). The known-image probability computer 1200 inputs the computed known-image probability into the image classifier 1400.

The unseen-image classifier 1300 computes likelihoods of the content indicated by the image indicated by the input information being classified into the respective classes (step S203). The unseen-image classifier 1300 inputs the computed likelihoods for the respective classes into the image classifier 1400.

Next, the image classifier 1400 uses the known-image probability input from the known-image probability computer 1200 to correct the likelihoods input from the unseen-image classifier 1300 (step S204). The image classifier 1400 inputs the corrected likelihoods into the estimated result output unit 1500.

Next, the estimated result output unit 1500 estimates the class into which the content indicated by the image indicated by the input information should be classified, on the basis of the corrected likelihoods input from the image classifier 1400. The estimated result output unit 1500 then outputs, as an estimated result, a label indicative of the estimated class (step S205). After outputting the estimated result, the image classification system 1000 terminates the image classification processing.

Description of Advantageous Effects

The image classification system 1000 of the present exemplary embodiment includes the known-image probability computer 1200 that outputs a known-image probability, which is a probability that the image corresponds to a known image. The image classification system 1000 also includes the unseen-image classifier 1300 that computes likelihoods of the content indicated by the input image being classified into respective classes including the classes of unseen images and the classes of known images. The image classification system 1000 also includes the image classifier 1400 that corrects the likelihoods output from the unseen-image classifier 1300 by using the known-image probability output from the known-image probability computer 1200.

In a typical image classification system, the label of an unseen image is not used in learning of a label estimation model. This causes a problem that the estimation model overfits to the labels of known images used as the training data, resulting in degraded estimation accuracy of the label estimated for the image included in the test data.

The image classification system 1000 of the present exemplary embodiment is capable of improving the accuracy of the label estimated for the image included in the test data. This is because the image classifier 1400 corrects the output likelihood using the known-image probability. The known-image probability computer 1200 of the present exemplary embodiment is configured to assist the unseen-image classifier 1300, so the estimation accuracy of the label estimated for the image included in the test data is improved.

Second Exemplary Embodiment

[Description of Configuration]

Figure 6:
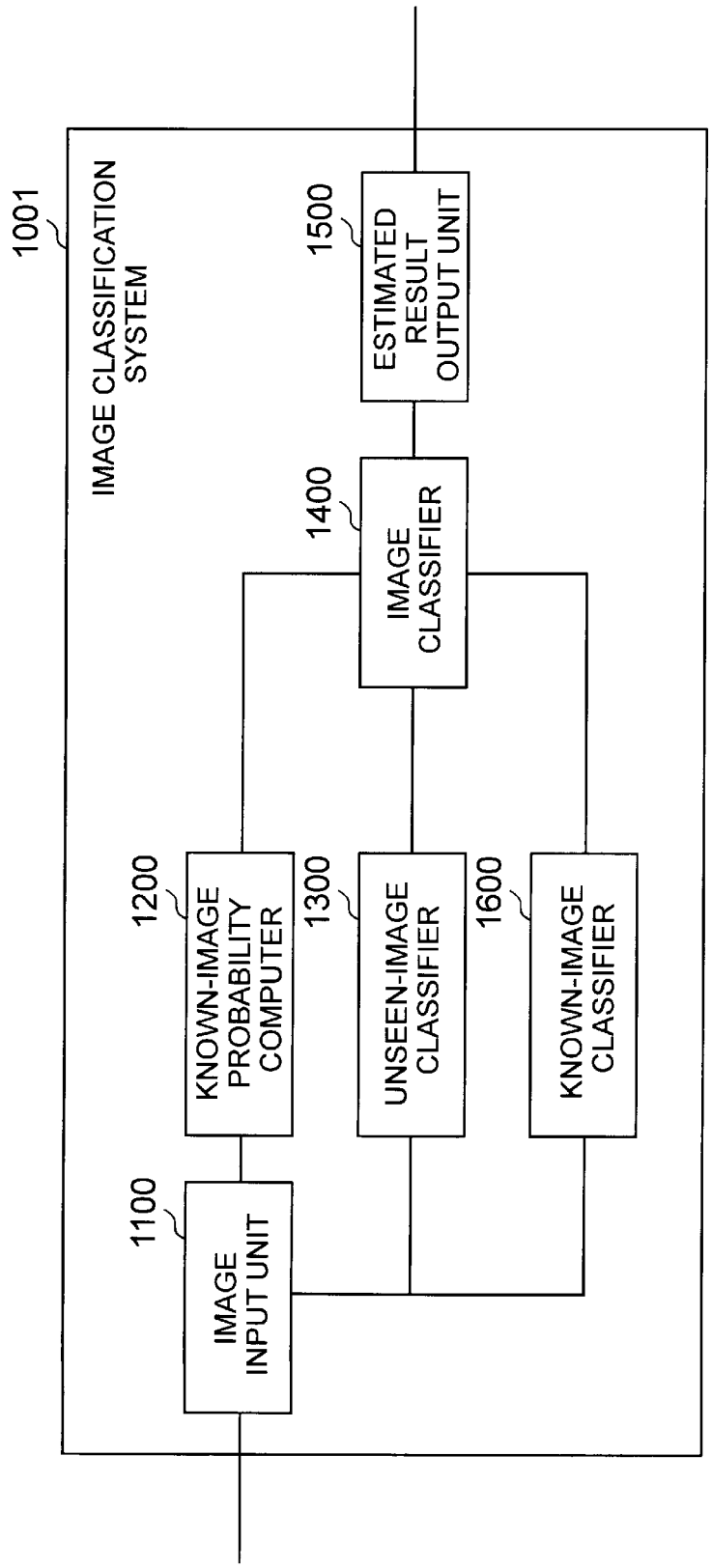
FIG. 6 is a block diagram showing an example of a structure of a second exemplary embodiment of the image classification system according to the present invention.

A second exemplary embodiment of the present invention will now be described with reference to the drawings. FIG. 6 is a block diagram showing an example of a structure of the second exemplary embodiment of the image classification system according to the present invention.

The image classification system 1001 of the present exemplary embodiment shown in FIG. 6 includes an image input unit 1100, a known-image probability computer 1200, an unseen-image classifier 1300, an image classifier 1400, an estimated result output unit 1500, and a known-image classifier 1600.

The image classification system 1001 of the present exemplary embodiment, different from the image classification system 1000 of the first exemplary embodiment, has the known-image classifier 1600 added. The configuration of the image classification system 1001 of the present exemplary embodiment is similar to that of the image classification system 1000 of the first exemplary embodiment, except that the known-image classifier 1600 has been added.

The functions of the image input unit 1100, the known-image probability computer 1200, and the estimated result output unit 1500 of the present exemplary embodiment are similar to those of the image input unit 1100, the known-image probability computer 1200, and the estimated result output unit 1500, respectively, of the first exemplary embodiment.

The unseen-image classifier 1300 of the present exemplary embodiment has a function of computing likelihoods that the content indicated by the image indicated by the information input from the image input unit 1100 is classified into respective classes of unseen images. The computed likelihoods are represented by a vector having the dimensions of the number of classes of unseen images. Each component of the vector is represented by a likelihood value that takes a value between 0 and 1.

The unseen-image classifier 1300 is made up of a conventional zero-shot recognizer, for example. Specifically, the conventional zero-shot recognizer estimates a label corresponding to the image indicated by the input information, using a transformation method between image features and label features learned using sets of known images and labels.

As the conventional zero-shot recognizer used in the present exemplary embodiment, the recognizer described in NPL 2, for example, may be used. Alternatively, a recognizer other than the one described in NPL 2 may be used as the conventional zero-shot recognizer.

In the present exemplary embodiment as well, information indicating images as a mixture of unseen and known images is input into the image input unit 1100. The unseen-image classifier 1300 outputs the likelihoods for the classes assumed to be indicated by the labels corresponding to the unseen images.

The known-image classifier 1600 of the present exemplary embodiment has a function of computing likelihoods that the content indicated by the image indicated by the information input from the image input unit 1100 is classified into respective classes of known images. The computed likelihoods are represented by a vector having the dimensions of the number of classes of known images. Each component of the vector is represented by a likelihood value that takes a value between 0 and 1.

The known-image classifier 1600 is made up, for example, of a convolutional neural network (CNN) recognizer (hereinafter, called CNN recognizer). Specifically, the CNN recognizer estimates a label corresponding to the image indicated by the input information, using the CNN learned using sets of known images and labels.

As the CNN recognizer for use in the present exemplary embodiment, VGG or ResNet, for example, is used. A recognizer other than the VGG or ResNet may be used as the CNN recognizer.

As explained above, information indicating images as a mixture of unseen and known images is input into the image input unit 1100. The known-image classifier 1600 outputs the likelihoods for the classes assumed to be indicated by the labels corresponding to the known images.

The image classifier 1400 of the present exemplary embodiment has a function of correcting both the likelihoods output from the unseen-image classifier 1300 and the likelihoods output from the known-image classifier 1600, by using the known-image probability output from the known-image probability computer 1200.

Specifically, the image classifier 1400 multiplies the likelihood for any class assumed to be indicated by the label corresponding to the known image input from the known-image classifier 1600, by the known-image probability. Further, the image classifier 1400 multiplies the likelihood for any class assumed to be indicated by the label corresponding to the unseen image input from the unseen-image classifier 1300, by (1—known-image probability).

The image classifier 1400 inputs the corrected likelihoods into the estimated result output unit 1500. The estimated result output unit 1500 estimates, for example, the class corresponding to the greatest likelihood among all the likelihoods multiplied by the known-image probability or (1—known-image probability), to be the class indicated by the label of the image indicated by the input information. The estimated result output unit 1500 outputs the label indicative of the estimated class as an estimated result.

It should be noted that the image classifier 1400 may multiply the likelihood by a value other than the known-image probability. For example, the image classifier 1400 may multiply the likelihood by a value obtained by performing an operation on the known-image probability using a given function, such as a square value of the known-image probability.

[Description of Operation]

Figure 7:
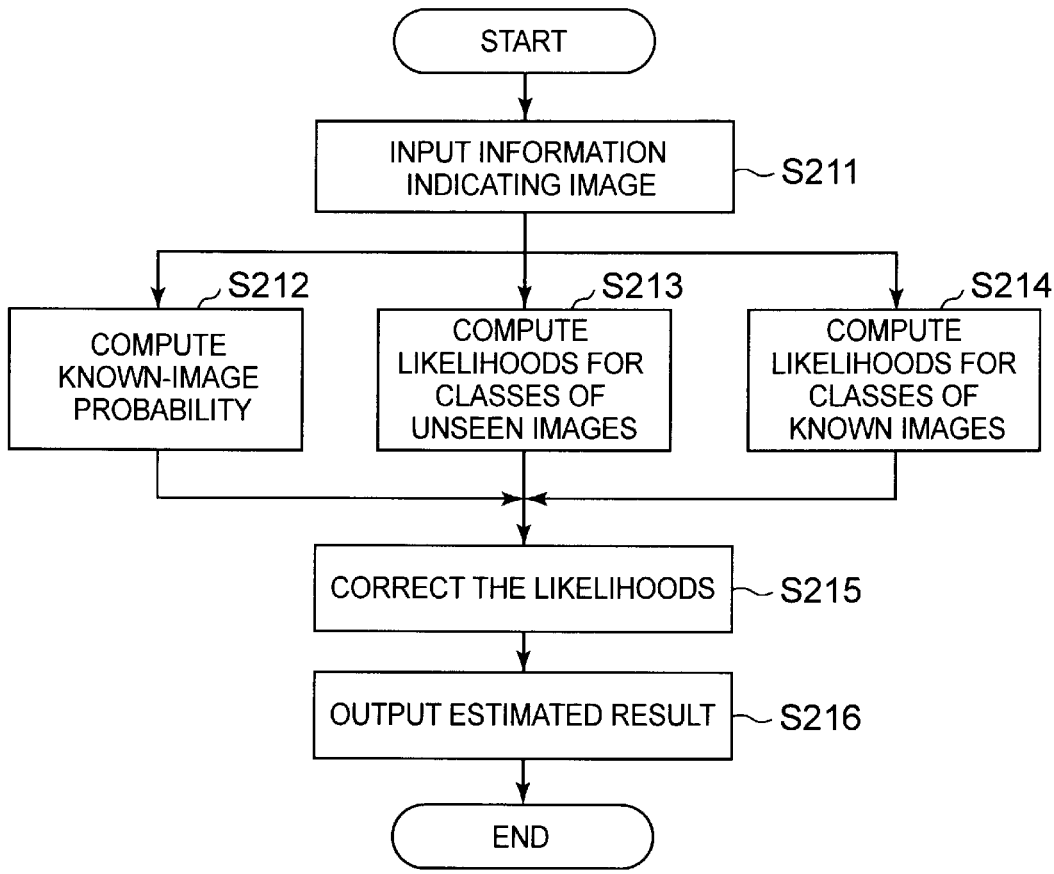
FIG. 7 is a flowchart showing an operation of image classification processing by the image classification system 1001 of the second exemplary embodiment.

An operation of classifying images by the image classification system 1001 of the present exemplary embodiment will now be described with reference to FIG. 7. FIG. 7 is a flowchart showing an operation of image classification processing by the image classification system 1001 of the second exemplary embodiment.

The processing in steps S211 to S212 shown in FIG. 7 is similar to the processing in steps S201 to S202 shown in FIG. 5.

The unseen-image classifier 1300 computes likelihoods of the content indicated by the image indicated by the input information being classified into respective classes of unseen images (step S213). The unseen-image classifier 1300 inputs the computed likelihoods for the respective classes into the image classifier 1400.

Further, the known-image classifier 1600 computes likelihoods of the content indicated by the image indicated by the input information being classified into respective classes of known images (step S214). The known-image classifier 1600 inputs the computed likelihoods for the respective classes into the image classifier 1400.

Next, the image classifier 1400 corrects both the likelihoods input from the unseen-image classifier 1300 and the likelihoods input from the known-image classifier 1600 by using the known-image probability input from the known-image probability computer 1200 (step S215). The image classifier 1400 inputs the corrected likelihoods into the estimated result output unit 1500.

The processing in step S216 shown in FIG. 7 is similar to the processing in step S205 shown in FIG. 5.

It should be noted that the estimator parameter learning processing by the image classification system 1001 of the present exemplary embodiment is similar to the estimator parameter learning processing shown in FIG. 4.

Description of Advantageous Effects

The image classification system 1001 of the present exemplary embodiment includes the known-image probability computer 1200 that outputs a known-image probability, which is a probability that the image corresponds to a known image. The image classification system 1001 also includes the unseen-image classifier 1300 that computes likelihoods of the content indicated by the input image being classified into classes of unseen images, and the known-image classifier 1600 that computes likelihoods of the content indicated by the input image being classified into classes of known images.

The image classification system 1001 also includes the image classifier 1400 that corrects both the likelihoods output from the unseen-image classifier 1300 and the likelihoods output from the known-image classifier 1600, by using the known-image probability output from the known-image probability computer 1200.

The image classification system 1001 of the present exemplary embodiment is capable of computing the likelihoods for the respective classes with higher accuracy as compared to the image classification system 1000 of the first exemplary embodiment. The reason is that the computation of the likelihoods for the classes of unseen images by the unseen-image classifier 1300 and the computation of the likelihoods for the classes of known images by the known-image classifier 1600 are respectively performed in more appropriate ways.

Figure 8:
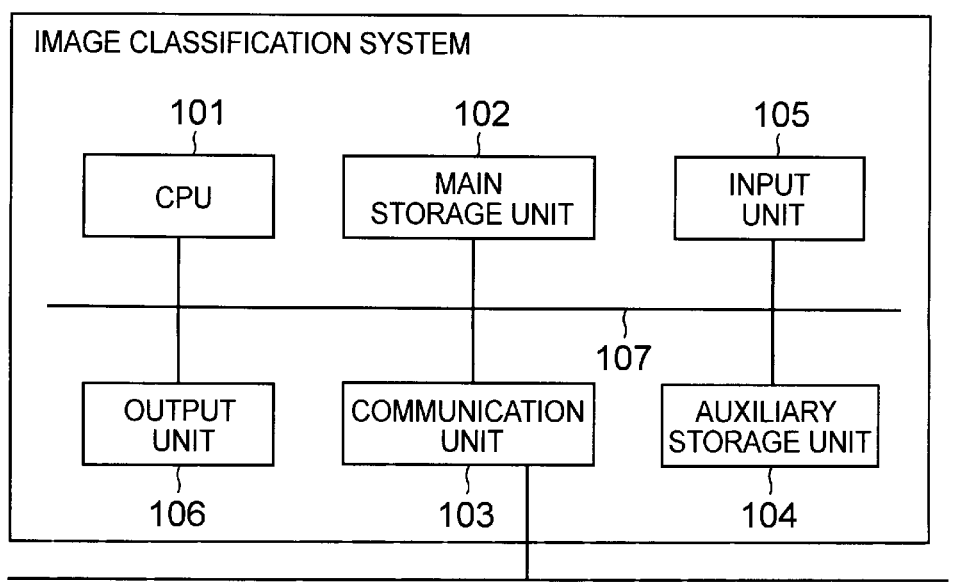
FIG. 8 is an explanatory diagram showing an example of a hardware structure of the image classification system according to the present invention.

A specific example of the hardware structure of the image classification system 1000 and the image classification system 1001 of the exemplary embodiments will now be described. FIG. 8 is an explanatory diagram showing an example of a hardware structure of the image classification system according to the present invention.

The image classification system shown in FIG. 8 includes a central processing unit (CPU) 101, a main storage unit 102, a communication unit 103, and an auxiliary storage unit 104. The system may also include an input unit 105 for a user to manipulate, and an output unit 106 for presenting processing results or the course of processing contents to the user.

The main storage unit 102 is used as a work area of data or a temporary saving area of data. The main storage unit 102 is, for example, a random access memory (RAM).

The communication unit 103 has a function of inputting data from and outputting data to peripherals via a wired or wireless network (information communication network).

The auxiliary storage unit 104 is a non-transitory tangible storage medium. Examples of the non-transitory tangible storage medium include a magnetic disk, magneto-optical disk, compact disk read only memory (CD-ROM), digital versatile disk read only memory (DVD-ROM), and semiconductor memory.

The input unit 105 has a function of inputting data and processing instructions. The input unit 105 is an input device such as a keyboard, mouse, etc.

The output unit 106 has a function of outputting data. The output unit 106 is, for example, a display device such as a liquid crystal display device, or a printing device such as a printer.

Further, as shown in FIG. 8, in the image analysis device, each component is connected to a system bus 107.

The auxiliary storage unit 104 stores, for example, a program for realizing the image input unit 1100, the known-image probability computer 1200, the unseen-image classifier 1300, the image classifier 1400, the estimated result output unit 1500, and the known-image classifier 1600.

The image input unit 1100 may receive information indicating images via the communication unit 103. The estimated result output unit 1500 may transmit estimated results via the communication unit 103.

It should be noted that the image classification system 1000 and the image classification system 1001 may be realized by hardware. For example, the image classification system 1000 may have installed therein a circuit that includes a hardware component such as large scale integration (LSI) in which a program for realizing the functions as shown in FIG. 1 is incorporated.

Alternatively, the image classification system 1000 and the image classification system 1001 may be realized by software, as the CPU 101 shown in FIG. 8 executes a program that provides the functions of the components shown in FIG. 1 or the functions of the components shown in FIG. 6.

When realized by software, the CPU 101 loads the program stored in the auxiliary storage unit 104 to the main storage unit 102 and executes the same to control the operations of the image classification system 1000 or the image classification system 1001, to thereby realize the functions by software.

Further, some or all of the components may be realized by general-purpose circuits (circuitry), dedicated circuits, processors, or a combination thereof. They may be configured by a single chip, or by a plurality of chips connected via a bus. Some or all of the components may also be realized by a combination of the above-described circuits or the like and the program.

In the case where some or all of the components are realized by a plurality of information processing devices or circuits, the information processing devices or circuits may be arranged in a centralized manner or in a distributed manner. For example, the information processing devices or circuits may be realized in the form of a client-and-server system, cloud computing system, or the like, where each device or circuit is connected via a communication network.

Figure 9:
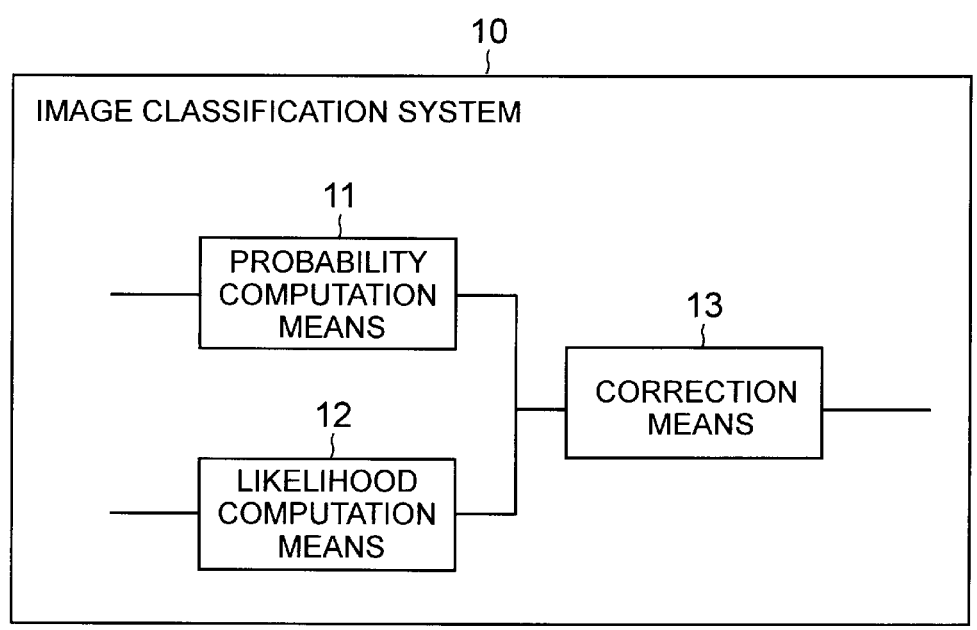
FIG. 9 is a block diagram showing an overview of the image classification system according to the present invention.

An overview of the present invention will now be described. FIG. 9 is a block diagram showing an overview of the image classification system according to the present invention. The image classification system 10 according to the present invention includes: a probability computation means 11 (for example, the known-image probability computer 1200) which computes a known-image probability, which is the probability that an input image corresponds to a known image associated with a seen label that indicates the class into which content indicated by the known image is classified; a likelihood computation means 12 (for example, the unseen-image classifier 1300) which computes both the likelihood that content indicated by the input image is classified into the same class as content indicated by an unseen image associated with an unseen label, and the likelihood that the content indicated by the input image is classified into the same class as the content indicated by the known image; and a correction means 13 (for example, the image classifier 1400) which corrects each computed likelihood using the computed known-image probability.

With such a configuration, the image classification system is able to accurately estimate the label of the image included in the test data.

Further, the image classification system 10 may include a label estimation means (for example, the estimated result output unit 1500) which estimates a label of the input image using the corrected likelihoods.

With such a configuration, the image classification system is able to accurately estimate the label of the image included in the test data.

Further, the probability computation means 11 may include a plurality of probability estimation means (for example, the known-image probability estimators 1211₁ to 1211ₙ) which estimates a probability that the input image corresponds to a known image, and a learning means (for example, the parameter learning unit 1212) which learns respective parameters of the plurality of probability estimation means on the basis of training data including a known image.

With such a configuration, the image classification system is able to improve the estimation accuracy of the estimators that estimate the probabilities that the input image corresponds to a known image.

Further, the probability computation means 11 may compute the known-image probability using a plurality of probabilities estimated respectively by the plurality of probability estimation means.

With such a configuration, the image classification system is able to improve the accuracy of the computed known-image probability.

Further, the likelihood computation means 12 may include an unseen-image likelihood computation means (for example, the unseen-image classifier 1300) which computes the likelihood that content indicated by the input image is classified into the same class as content indicated by an unseen image, and a known-image likelihood computation means (for example, the known-image classifier 1600) which computes the likelihood that the content indicated by the input image is classified into the same class as the content indicated by the known image.

With such a configuration, the image classification system is able to more accurately estimate the label of the image included in the test data.

Further, the correction means 13 may correct the computed likelihoods by multiplying the likelihood computed by the known-image likelihood computation means by the computed known-image probability and multiplying the likelihood computed by the unseen-image likelihood computation means by a value obtained by subtracting the computed known-image probability from 1.

With such a configuration, the image classification system is able to accurately estimate the label of the image included in the test data.

While the present invention has been described with reference to the exemplary embodiments and examples, the present invention is not limited to the exemplary embodiments and examples above. The configurations and details of the present invention can be subjected to various modifications appreciable by those skilled in the art within the scope of the present invention.

REFERENCE SIGNS LIST

10, 1000, 1001 image classification system
11 probability computation means
12 likelihood computation means
13 correction means
101 CPU
102 main storage unit
103 communication unit
104 auxiliary storage unit
105 input unit
106 output unit
107 system bus
1100 image input unit
1200 known-image probability computer
1210 known-image probability ensemble estimation unit
1211₁ to 1211ₙ known-image probability estimator
1212 parameter learning unit
1300 unseen-image classifier
1400 image classifier
1500 estimated result output unit
1600 known-image classifier The inventio claimed is:

1. An image classification system comprising:
a memory configured to store instructions; and
a processor configured to execute the instructions to:
compute a known-image probability, that an input image corresponds to a known image associated with a seen label indicating a class into which content of the known image has been classified;
compute both a first likelihood that content of the input image should be classified into a class as content of an unseen image associated with an unseen label, and a second likelihood that the content of the input image should be classified into a class into which the content of the known image has been classified; and
correct each of the first and second likelihoods using the computed known-image probability.

2. The image classification system according to claim 1, wherein the processor is configured to execute the instructions to further:

estimate a label of the input image using the corrected first and second likelihoods.

3. The image classification system according to claim 1, wherein the known image is one of a plurality of known images, and the known-image probability is computed by:
   estimating a probability that the input image corresponds to each of the plurality of known images; and
   learn parameters on the basis of training data including the plurality of known images.

4. The image classification system according to claim 3, wherein the known-image probability is computed by further:
   computing the known-image probability using the probability that the input image corresponds to each of the plurality of known images.

5. The image classification system according to claim 4, wherein each of the first and second likelihoods is corrected by:
   multiplying the second likelihood by the known-image probability and multiplying the first likelihood by a value obtained by subtracting the known-image probability from 1.

6. An image classification method comprising:
   computing, by a processor, a known-image probability, that an input image corresponds to a known image associated with a seen label indicating a class into which content of the known image has been classified;
   computing, by the processor, both a first likelihood that content of the input image should be classified into a class as content of an unseen image associated with an unseen label, and a second likelihood that the content of the input image should be classified into a class into which the content of the known image has been classified; and
   correcting, by the processor, each of the first and second likelihoods using the computed known-image probability.

7. The image classification method according to claim 6, further comprising:
   estimating, by the processor, a label of the input image using the corrected first and second likelihoods.

8. A non-transitory computer-readable capturing medium storing an image classification program that when executed by a computer causes the computer to perform:
   computing a known-image probability, which is that an input image corresponds to a known image associated with a seen label indicating a class into which content of the known image has been classified;
   computing both a first likelihood that content of the input image should be classified into a class as content by of an unseen image associated with an unseen label, and a second likelihood that the content of the input image should be classified into a class into which the content of the known image has been classified; and
   correcting each of the first and second likelihoods using the computed known-image probability.

9. The medium according to claim 8, wherein the image classification program, when executed by the computer, causes the computer to further perform:
   estimating a label of the input image using the corrected first and second likelihoods.

10. The image classification system according to claim 2, wherein the known image is one of a plurality of known images, and the known-image probability is computed by:
    estimating a probability that the input image corresponds to each of the plurality of known images; and
    learn parameters on the basis of training data including the plurality of known images.

11. The image classification system according to claim 10, wherein the known-image probability is computed by further:
    computing the known-image probability using the probability that the input image corresponds to each of the plurality of known images.

12. The image classification system according to claim 11, wherein each of the first and second likelihoods is corrected by:
    multiplying the second likelihood by the known-image probability and multiplying the first likelihood by a value obtained by subtracting the known-image probability from 1.

* * * * *